United States Patent
Clemons

(10) Patent No.: US 10,655,298 B2
(45) Date of Patent: May 19, 2020

(54) SHEAR BLADE HAVING A POSITIVE CAMBER AND METHOD OF ADDING A POSITIVE CAMBER TO A SHEAR BLADE

(71) Applicant: Caterpillar Inc., Peoria, IL (US)

(72) Inventor: John K. Clemons, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 15/011,718

(22) Filed: Feb. 1, 2016

(65) Prior Publication Data

US 2016/0145830 A1    May 26, 2016

Related U.S. Application Data

(63) Continuation of application No. 13/870,549, filed on Apr. 25, 2013, now abandoned.

(51) Int. Cl.
| | |
|---|---|
| *E02F 3/96* | (2006.01) |
| *B23D 35/00* | (2006.01) |
| *E02F 9/28* | (2006.01) |
| *B02C 1/02* | (2006.01) |
| *B23D 17/00* | (2006.01) |
| *B23C 1/10* | (2006.01) |

(52) U.S. Cl.
CPC ............. *E02F 3/965* (2013.01); *B02C 1/02* (2013.01); *B23C 1/10* (2013.01); *B23D 17/00* (2013.01); *B23D 35/001* (2013.01); *E02F 9/2883* (2013.01)

(58) Field of Classification Search
CPC ...... E02F 3/965; E02F 9/2883; B23D 35/001; B23D 17/00; B23D 31/008; B02C 1/10; B02C 1/02; B02C 1/043

USPC .............................. 241/101.71, 101.73, 266
See application file for complete search history.

(56) References Cited

U.S. PATENT DOCUMENTS

| | | | |
|---|---|---|---|
| 5,146,683 | A | 9/1992 | Komatsu |
| 5,992,023 | A | 11/1999 | Sederberg et al. |
| 6,119,970 | A | 9/2000 | LaBounty et al. |
| 6,926,217 | B1 | 8/2005 | LaBounty et al. |
| 7,044,037 | B2 | 5/2006 | Ramun |
| 7,954,742 | B2 | 6/2011 | Ramun |
| 2009/0090009 | A1 | 4/2009 | Wilkins et al. |
| 2009/0194619 | A1 | 8/2009 | Andrina |

FOREIGN PATENT DOCUMENTS

| | | |
|---|---|---|
| CN | 201659328 | 12/2010 |
| CN | 202318386 | 7/2012 |
| DE | 102009059940 | 6/2011 |
| EP | 0387258 | 4/1989 |
| JP | 2003011087 | 1/2003 |
| WO | 2004028729 | 4/2004 |

*Primary Examiner* — Anthony D Stashick
*Assistant Examiner* — Onekki P Jolly
(74) *Attorney, Agent, or Firm* — Oblon, McClelland, Maier & Neustadt

(57) ABSTRACT

A hydraulically activated shear is provided. The shear includes: a first jaw; a second jaw sliding past the first jaw in a shearing motion; and a first cutting plate attached to at least one side of the first and second jaws, the first cutting plate defining a shear edge and a shear surface, the shear surface having a positive camber with respect to a plane perpendicular to the jaws, wherein at least one of the first and second jaws is actuated by a hydraulic cylinder.

17 Claims, 8 Drawing Sheets

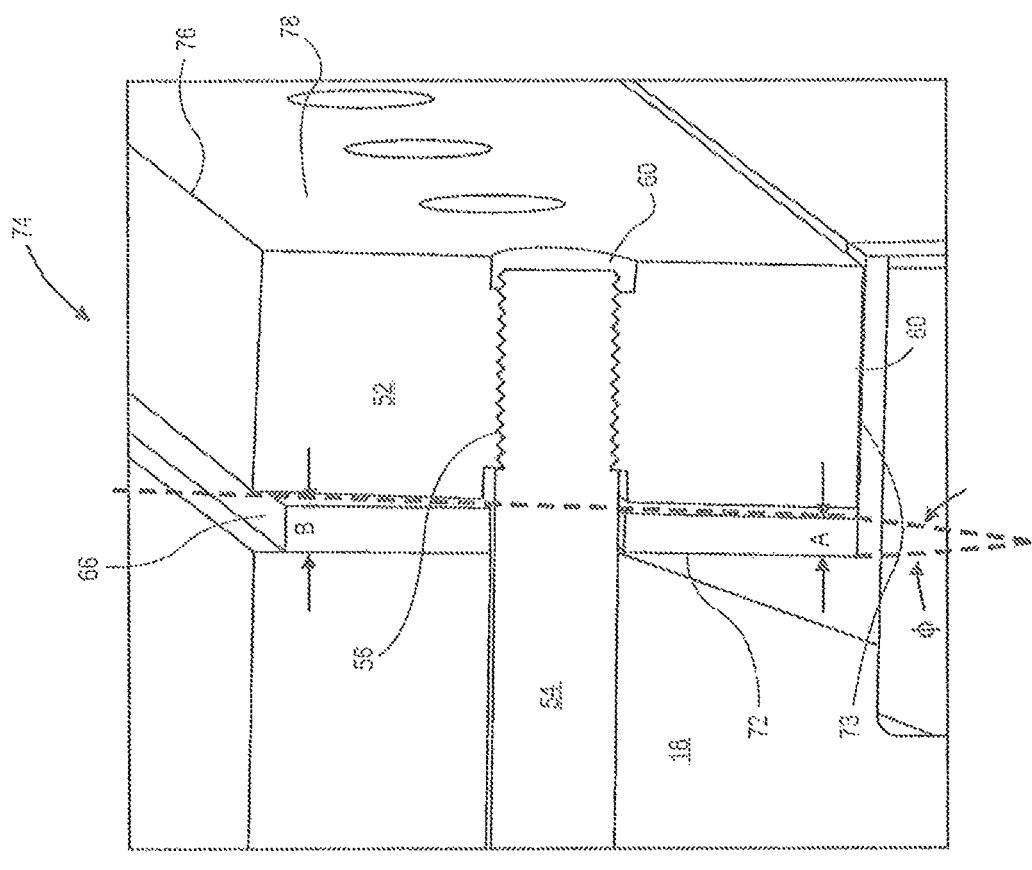

SHEAR BLADE HAVING A POSITIVE CAMBER AND METHOD OF ADDING A POSITIVE CAMBER TO A SHEAR BLADE

RELATED APPLICATIONS

The present disclosure claims the right to priority based on, and is a continuation of U.S. patent application Ser. No. 13/870,549 filed on Apr. 25, 2013, which is fully incorporated herein.

TECHNICAL FIELD

This disclosure relates generally to shears and, more particularly, to shears having cutting plates having a positive camber.

BACKGROUND

Shears are often used to cut things. Shears, whether they be scissors for cutting paper or large hydraulic shears for cutting metal or other materials, operate on similar principles. Two relatively flat surfaces move past each other and are close enough to slide against each other. The material to be cut is located between the two surfaces and fails in shear causing the material to be cut.

While the system works well for cutting a variety of objects, problems can develop. For example, simple paper cutting shears may not always cut if the paper is allowed to move substantially parallel to the shears and the two shearing surfaces move past the paper. The problem of material sliding down the shearing surface rather than being cut is not limited to paper cutting shears but happens in shears of all types. This can cause problems not only with small paper cutting shears but large hydraulic shears.

For example, when using large hydraulic shears to cut objects such as metal, if the shears are worn, not properly adjusted, ill designed, or for variety of other reasons, the shears may not cut. Rather, in such instances, the metal may smear down the sides of the shear surfaces. This can cause a situation where the metal that was to be cut jams the jaws of the shear. It can even cold weld itself to the shearing surfaces on the shear jaws. This may result in a substantial delay while the operators of the hydraulic shears may need heavy tools to remove the fouling from the shear jaws.

Heavy-duty shears such as hydraulically activated shears often use shear plates that are set within shear plate pockets. The shear plates are often removable from the shear jaws so that the shear plates (which are a high wear part) may be rotated, removed for maintenance or replaced when they become worn. Shims can provide a desired positioning of the shear plate within the shear plate pocket. Traditionally, shear plates are set to be at a neutral position or, in other words at 0 angle with respect to the opposing jaw. This may be referred to as a neutral camber. If the shear plates having negative angle, sometimes referred to as a negative camber, they may actually pull the workpiece to be sheared toward the jaws or create other problems.

One example sheer is described in U.S. Pat. No. 6,926,217. This patent describes a shear jaw where a cross blade located at an end or tip of the jaw is located at an acute angle between 1 and 30 degrees. While this cross blade may assist in snipping material at the end or tip of the jaw, it does not address the problems associated with the cutting surfaces located at the sides of the jaw. The sides of the jaw is where a majority of the cutting or shearing often occurs. As a result, the embodiment illustrated in this patent does not specifically address the problems described herein.

In addition to these problems, substantial force may be required to cause some materials to be sheared. As result, shears are very robustly built and operated by robust hydraulic systems. Furthermore, shears often are called upon to provide many cutting operations. As result, the shear surfaces or edges that help define the shear surfaces may become rounded or otherwise dull.

Accordingly it would be desirable to provide a set of shears that can provide any, some, or all of the following characteristics: more reliably cut material rather than smearing it along the shear surfaces, reduce the amount of force required to cut material, and provide many cutting operations before needing any adjustments.

SUMMARY

In one aspect, the disclosure describes a hydraulically activated shear. The shear includes: a first jaw; a second jaw configured to slide past the first jaw in a shearing motion; and a first cutting plate attached to a side of at least one of the first and second jaws, the first cutting plate defining a shear edge and a shear surface, the shear surface having a positive camber with respect to a plane perpendicular to the jaws, wherein at least one of the first and second jaws is actuated by a hydraulic cylinder.

In another aspect, the disclosure describes a hydraulically activated shear. The shear includes: a first means for shearing; a second means for shearing configured to slide past the first means for shearing in a shearing motion; and a means for providing a cutting edge attached to a side of at least one of the first and second means for shearing, the first means for shearing defining a shear edge and a shear surface the shear surface having a positive camber with respect to a plane perpendicular to the jaws, wherein at least one of the first and second jaws is actuated by a hydraulic cylinder.

In yet another aspect, the disclosure describes a shear. The shear includes a first jaw having a first side shear surface; a second jaw having a second shear surface wherein the first and second jaws are configured to slide past each other and the first and second shear surfaces are nearly but not parallel, the first shear surface has a positive camber and is cambered toward the second shear surface.

BRIEF DESCRIPTION OF THE DRAWINGS

FIG. 4 is a perspective view of a shear in accordance with the disclosure.

FIG. 5 is a perspective view of a cutting plate and shim located in a cutting plate pocket of a shear jaw in accordance with the disclosure.

DETAILED DESCRIPTION

Figure 1:
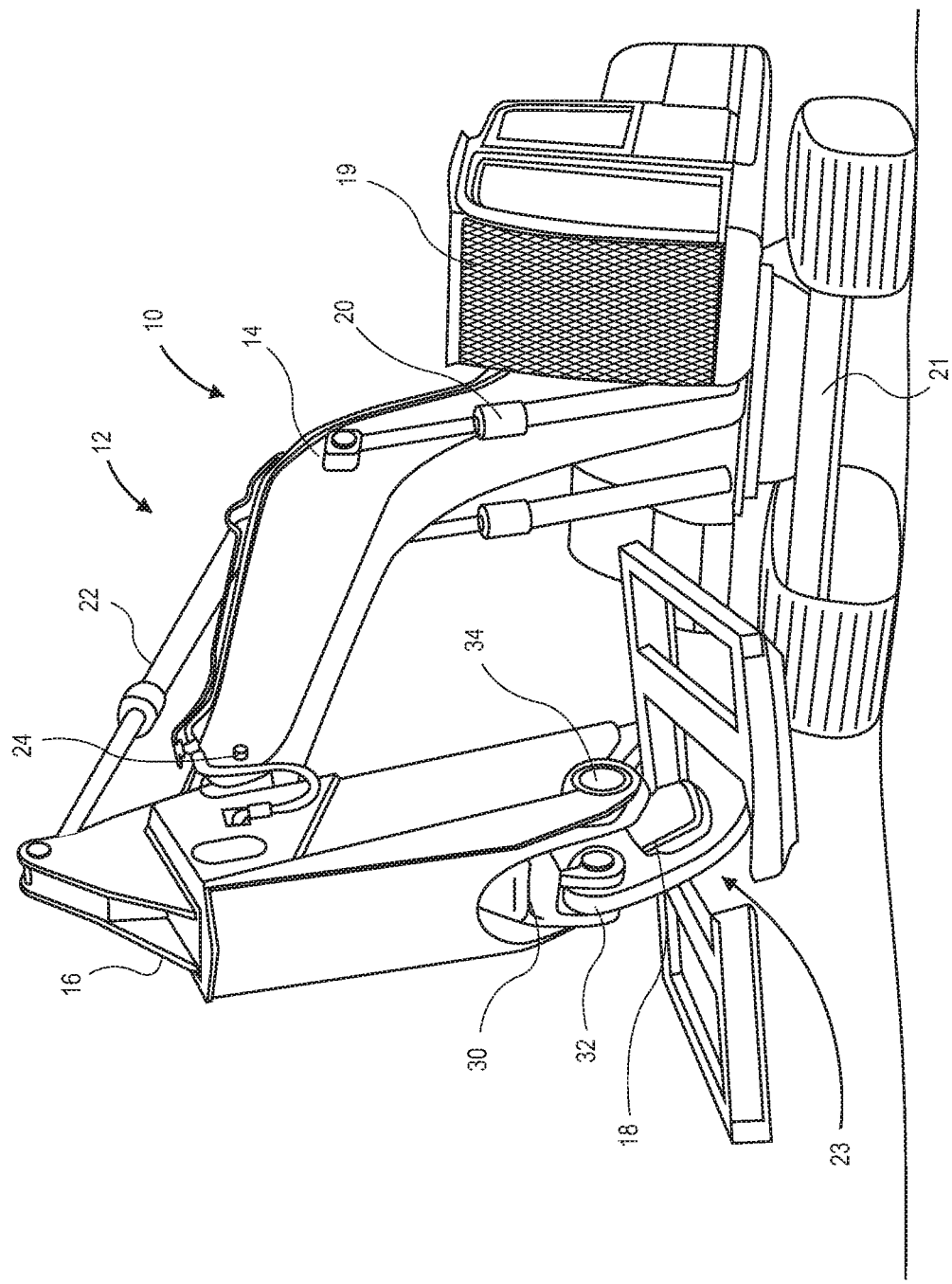
FIG. 1 is a perspective view of a machine equipped with a hydraulic shear in accordance with the disclosure.

With reference to the drawings, like reference numbers refer to like elements, FIG. 1 illustrates a machine 10 having an arm 12. The arm 12 includes a boom 14 pivotally attached to a stick 16. The stick 16 includes a shear 18. The boom 14 is raised and lowered by hydraulic pistons and cylinders 20. In the machine 10 illustrated in FIG. 1, the arm 12 is also rotated along with the cab 19 upon a tracked chassis 21. The machine 10 illustrated in FIG. 1 is one example of a machine 10 that can use a shear 18 in accordance with the disclosure. However, in other embodiments, other types of machines may also be used. In addition, in some embodiments, the shear 18 may not even be hydraulically actuated. However, in the example illustrated and in the figures and discussed herein, the shear 18 is hydraulically actuated.

As shown in FIG. 1, the stick 16 is pivoted by a hydraulic piston and cylinder 22. The stick 16 is connected to the boom 14 via a pivotal connection 24. The shear 18 includes a set of jaws 23. The jaws 23 include a fixed jaw 26 and a movable jaw 28, which may be referred to herein as a first jaw and a second jaw, respectively, or vice versa. The movable jaw 28 is actuated by a hydraulic piston and cylinder 30 which connects to the movable jaw 28 at the pivotal connection 32. The movable jaw 28 can pivot with respect to the fixed jaw 26 about the pivotal connection 34. In the example shown and described herein, one jaw 26 is a fixed jaw and another jaw 28 is a movable jaw. However, in other embodiments in accordance with the disclosure, both jaws 23 may be movable. Thus, in the other embodiments, the jaws 23 may be interpreted as pivoting with respect to each other at the pivotal connection 32. Further, the jaws 23 are not limited to pivotal connections only. In some embodiments the jaws 23 may move laterally with the respect to each other or in some other manner.

Figure 2:
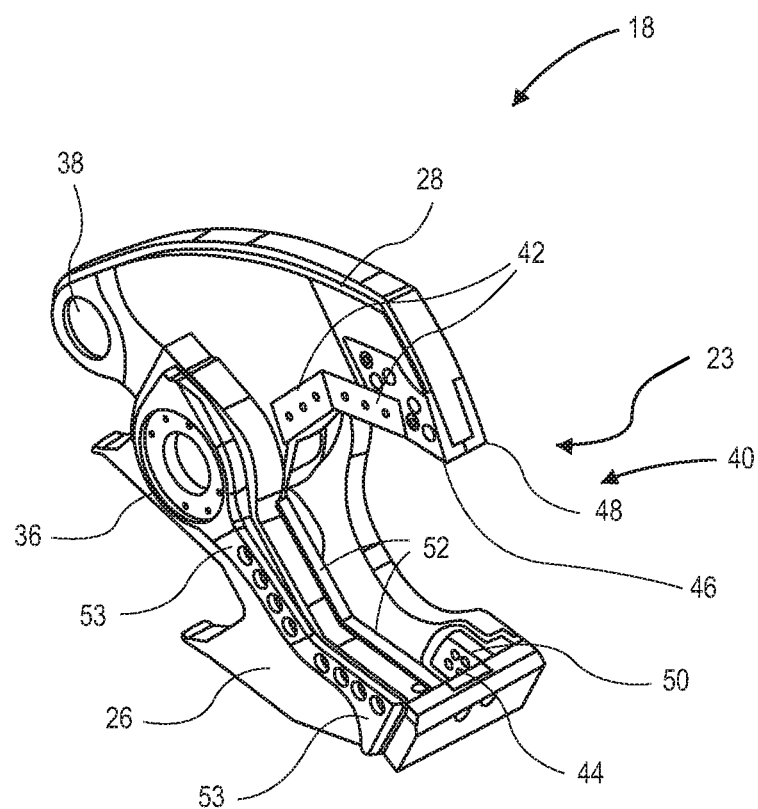
FIG. 2 is a perspective view of a shear in accordance with the disclosure.

FIG. 2 illustrates a perspective view of a shear 18 in accordance with an embodiment. The shear 18 includes jaws 23. The jaws 23 include a fixed jaw 26 and a movable jaw 28. The fixed jaw 26 and the movable jaw 28 each have a hole 36 through which a pivot shaft 34 (shown in FIG. 1) is placed. The jaws 23 pivot with respect to each other about the pivot shaft 34. While jaw 26 is referred to as a fixed jaw and jaw 28 is referred to as movable, one of ordinary skill the art will understand that the two jaws 26 and 28 may be considered to be pivotable with respect to each other. In other embodiments both jaws 26 and 28 may be movable. Thus, in the other embodiments, the jaws 23 may be interpreted as pivoting with respect to each other at the pivotal connection 32. Movable jaw 28 also has a hole 38 to provide a pivotal connection 32 (as shown in FIG. 1) to the hydraulic piston and cylinder 30. It is a hydraulic piston and cylinder 30 which actuates or moves the movable jaw 28. In embodiments, the jaws 23 may be actuated by other means.

Both the fixed jaw 26 and the movable jaw 28 have cutting plates 40. The cutting plates are collectively referred to by reference numeral 40. Specific cutting plates have specific reference numerals which are described further below. The cutting plates 40 are removable from the jaws 23 for maintenance and replacement and/or repositioning. It is the movement of cutting plates 40 on different jaws 23 moving past each other which create the shearing or cutting action. The cutting plates 40 are subject to a high amount of wear and for this reason, in some optional embodiments, they are removable in order to be replaced, repositioned, or for maintenance.

The side cutting plates 42 are located on the movable jaw 28. An end cutting plate 44 is located at an end or tip of the fixed jaw 26. The movable jaw 28 also has a left tip cutting plate 46 and a right tip cutting plate 48. The fixed jaw 26 may also be equipped with a small right side cutting plate 50 and more left side cutting plates 52. Attaching plates 53 are also located on the fixed jaw 26. The attaching plates 53 will be described in further detail below.

Figure 3:
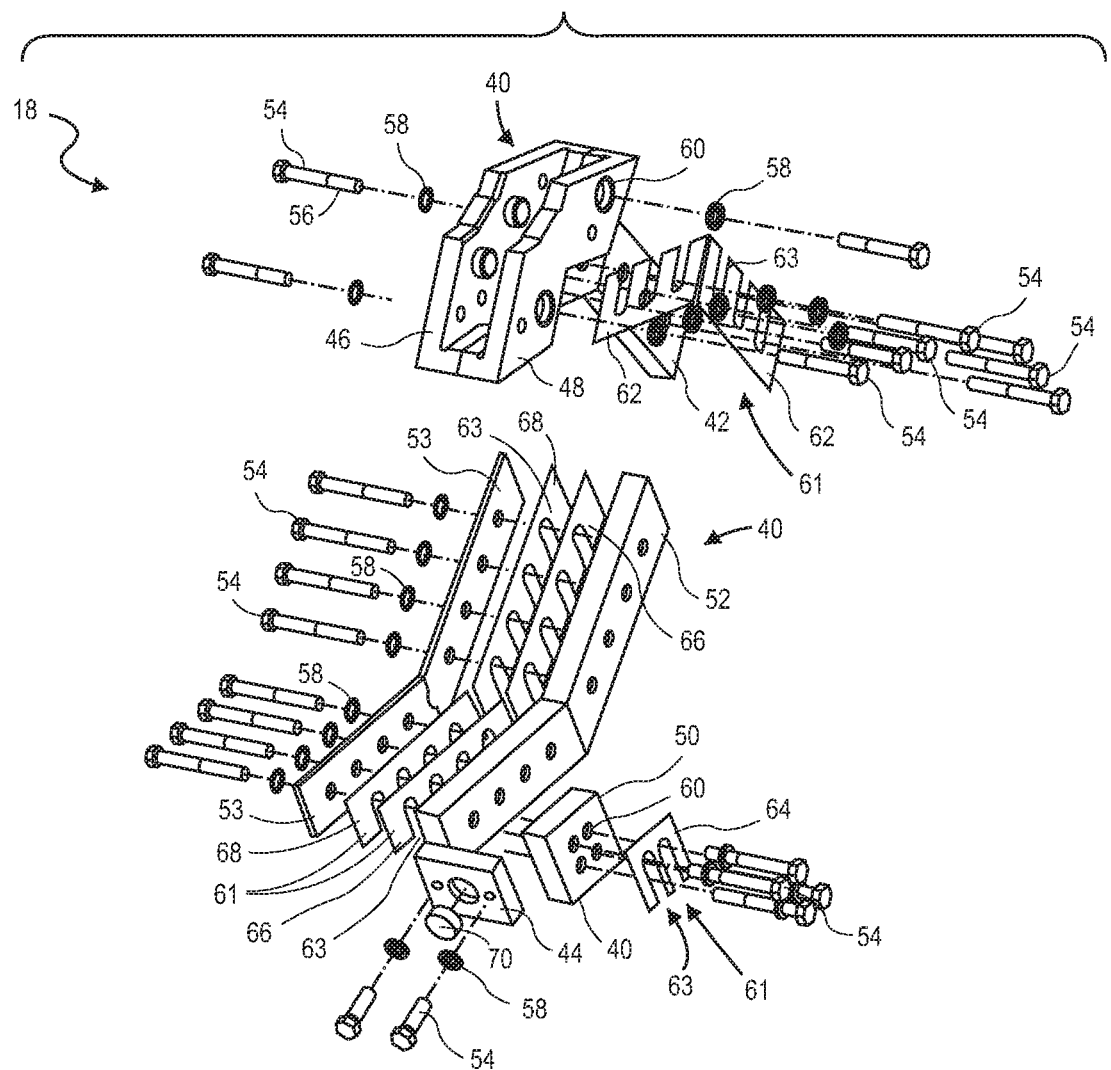
FIG. 3 is an exploded view of certain components of a shear in accordance with the disclosure.

FIG. 3 is an exploded view of some of the components associated with a shear 18. The fixed jaw 26 and movable jaw 28 are not illustrated in order to avoid overcrowding of the FIG. Bolts 54 having threaded portions 56 are used with washers 58 to attach the cutting plates 42 to the jaws 23. The cutting plates 40 have holes 60 located in them to facilitate attaching the cutting plates 40 via the bolts 54. In some embodiments, shims 61 are used to provide a desired orientation of the cutting plates 40 when mounted onto the jaws 23. For example, the small right side cutting plate 50 has a corresponding shim 61. The shim 61 is equipped with slots 63 which allows the shim 61 to be positioned without moving the position of the bolts 54 within the holes 60. In some embodiments, the holes 60 in the cutting plates 40 are threaded and thereby communicate with the threaded portions 56 on the bolts 54 to hold the bolts 54, the shims 61 and the cutting plates 40 in place on the jaws 23. In some embodiments, and as shown in FIG. 3., different shims 61 maybe used for different cutting plates 40. For example, shims 62 correspond to the cutting plates 42 on the movable jaw 28. A shim 64 corresponds to the end cutting plate 44. Shims 66 are used along with the side cutting plates 52 located on the fixed jaw 26.

In addition to the cutting plates 40 attaching plates 53 may also be used to facilitate attaching the cutting plates 42 the jaws 23. The attaching plates 53 provide a surface for the bolts 54 to compress and therefore trap the fixed jaw 26 between the cutting plates 52 and the attaching plates 53 thereby attaching the cutting plates 53 to the fixed jaw 26. In some embodiments, as shown in FIG. 3, shims 68 may be used with the attaching plates 53. The shims 68 may also include slots 63 similar to that described with respect to the other shims 61.

FIG. 3 also shows other features such as a bushing lock 70 used in positioning attaching the end cutting plate 44 to the fixed jaw 26.

FIG. 4 is a perspective view of a shear 18. A portion of the left side cutting plate 52 on the fixed jaw 26 a portion of the fixed jaw 26 is illustrated in broken lines. This portion is enlarged as FIG. 5. FIG. 5 illustrates a portion of a shear 18 in accordance with an embodiment. The shear 18 includes a cut out portion referred to as a cutting plate pocket 74. A fixed left side cutting plate 52 is located in the cutting plate pocket 74. A shim 66 for the left side cutting plate is located between the left side cutting plate 52 and a side wall 72 of the cutting plate pocket 74. In some embodiments, the base 80 of the side cutting plate 52 may rest on a horizontal wall 73 of the cutting plate pocket 74. In other embodiments, the shim 66 and/or side cutting plate 52 may be spaced from the horizontal wall 73. The side cutting plate 52 is attached to the shear 18 by the threaded portion 56 of the bolt 54 located in the hole 60.

In the embodiment shown in FIG. 5 the shim 66 is tapered such that the thickness of the shim at the base as shown by arrow A is thinner than the thickness at the top are the shim 66 as illustrated by arrow D. In other words, the taper may be defined by an angle θ. In some embodiments the angle θ is between 0.2 and 2 degrees. In other embodiments the angle θ is between 0.45 and 1 degree. In the figures, the angle and distances represented by the lettered arrows are exaggerated and are not drawn to scale in order to better illustrate the fact that the taper exists and the general shape of the taper.

The angle or taper is passed on through the cutting plate 52 such that the cutting face 78 of the side cutting plate 52 is at approximately the same angle. When the cutting face 78 is at an angle, this is referred to as a camber. A positive camber is what is illustrated in the figures where the cutting edge 76 is located closer to the opposing jaw 23 then the rest of the cutting face 78. If the cutting face 78 was straight up and down with respect to the opposing jaw 23, such a position would be referred to as a mutual camber. If distance as illustrated by arrow A was greater than the distance illustrated by arrow B, then the cutting edge 76 would be farther away from the opposing jaw 23 then the rest of the cutting face 78. This would be a negative camber.

The positive camber may be accomplished, in some instances, by the cutting plate 52 having a substantially rectangular cross-section. By creating an angle or taper on the cutting face 78 a cutting edge 76 is defined. The cutting edge 76 extends farther out from the cutting plate pocket 74 then the cutting face 78 at the base 80 of the cutting plate. This provides some features. For example, when the shear 18 is compressing a workpiece within the jaws 23, the cutting edge 76 will assist in cutting or shearing the workpiece. Further, by having the cutting face 78 in a tapered condition such that the cutting edge 76 extending toward the opposing jaw 23 than the base 80 of the cutting face 78, the force required to move the jaws 23 past each other diminishes as the cutting edge 76 passes a corresponding cutting edge on the corresponding jaw. As result, less energy is required to move or slide the jaws 23 past each other.

Figure 6:
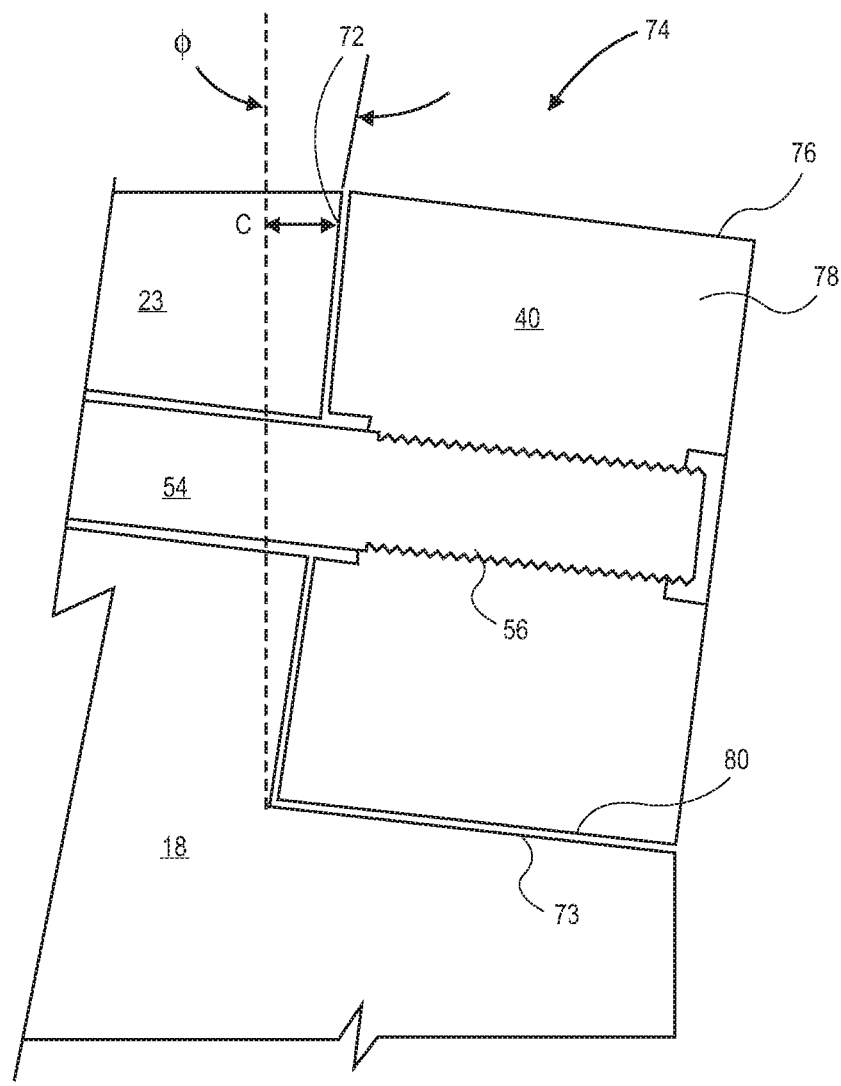
FIG. 6 is a partial cross-sectional view of a cutting plate mounted within a tapered cutting plate pocket in accordance with the disclosure.

FIG. 6 illustrates a partial end view of a shear 18 according to another embodiment. In contrast to the embodiment shown in FIG. 5, the embodiment shown in FIG. 6 has does not use a shim 61 to impart a taper to the cutting face 78. Rather the vertical wall 72 of the cutting plate pocket 74 not truly vertical but is tapered. The distance from vertical is illustrated by arrow C. It can also be expressed by an angle which starts at the intersection of the vertical wall 72 and the horizontal wall 73 of the cutting plate pocket 74. The angle θ may be the same as described above. Namely, in some embodiments the angle θ is between 0.2 and 2 degrees. In other embodiments is between 0.45 and 1 degree. The cutting-edge 76 extends farther out toward the opposing jaw 23 (not shown in FIG. 6) than any other portion of the cutting face 78. To accommodate the taper in the wall 72, the horizontal wall 73 may also be tapered in order to allow the generally rectangular cutting plate 40 to reside in cutting plate pocket 74 at a desired camber.

No shims 61 are used in the embodiment shown in FIG. 6. However in other embodiments shims 61 maybe used. The taper to the cutting face 78 is provided by the taper of the vertical wall 72. In other embodiments, the taper of the cutting face 78 may be a result of a tapered shim 61 and a tapered vertical wall 72. In the embodiment shown in FIG. 6, the cutting plate 40 is substantially rectangular in cross-section. As result, whatever taper occurs at the vertical wall 72 is translated to the cutting face 78. The cutting plate 40 is attached to the shear 18 via the threaded portion 56 of the bolt 54. The bolt 54 may also enter the cutting plate at an angle to more easily allow different cutting plates 40 to be installed in the cutting plate pocket 74. The base 80 of the cutting plate 40 may be in contact with the horizontal wall 73 of the cutting plate pocket 74 or the base 80 may be spaced from the horizontal wall 73 of the cutting plate pocket 74 depending on the individual requirements of a given situation.

Figure 7:
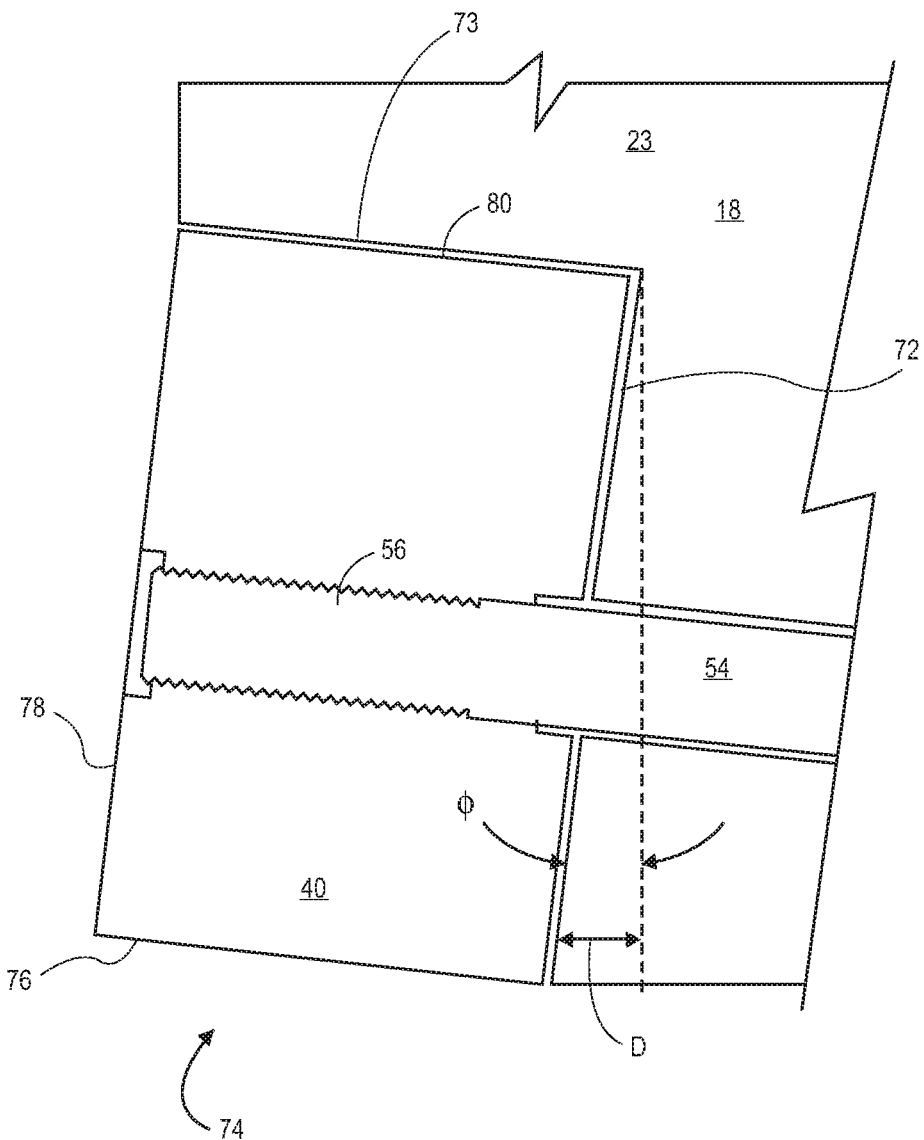
FIG. 7 is a partial cross-sectional view of a cutting plate mounted within a tapered cutting pocket in accordance with the disclosure.

FIG. 7 illustrates an opposing jaw 23 to the jaw 23 shown in FIG. 6. This jaw 23 may be a movable jaw 28. Similar to the embodiment shown in FIG. 6, the wall 72 of the cutting plate pocket 74 provides a taper and the wall 73 is also tapered to accomade the generally rectangular cross-section of the cutting plate 40. As result, the distance illustrated by arrow D from the location of the horizontal wall 73 from an actual horizontal line illustrated by dashed line gets longer the farther one moves from the horizontal wall 73. Another way to express the taper is by an angle θ. In some embodiments the angle θ is between 0.2 and 2 degrees. In other embodiments the angle is between 0.45 and 1 degree. The cutting plate 40 is attached to the jaw 23 by the threaded portion 56 of the bolt 54. The base portion 80 of the cutting plate 40 may or may not contact the horizontal wall 73 of the cutting plate pocket 74. As described with respect to the previous figures, the cutting edge 76 extends furthest towards an opposing jaw 23 farther than any other part of the cutting face 78.

In the embodiments shown and described in FIGS. 5 through 7 the cutting plates 40 have a substantially right angular cross-section and therefore translate any taper as result of the shim 61 or cutting plate pocket 74 to the cutting face 78. The fact that the cutting plates 40 are substantially rectangular in cross-section allows the cutting plates to be rotated in position or between various positions once the cutting edge 76 are cutting face 78 starts to exhibit signs of undesired amounts of wear.

Figure 8:
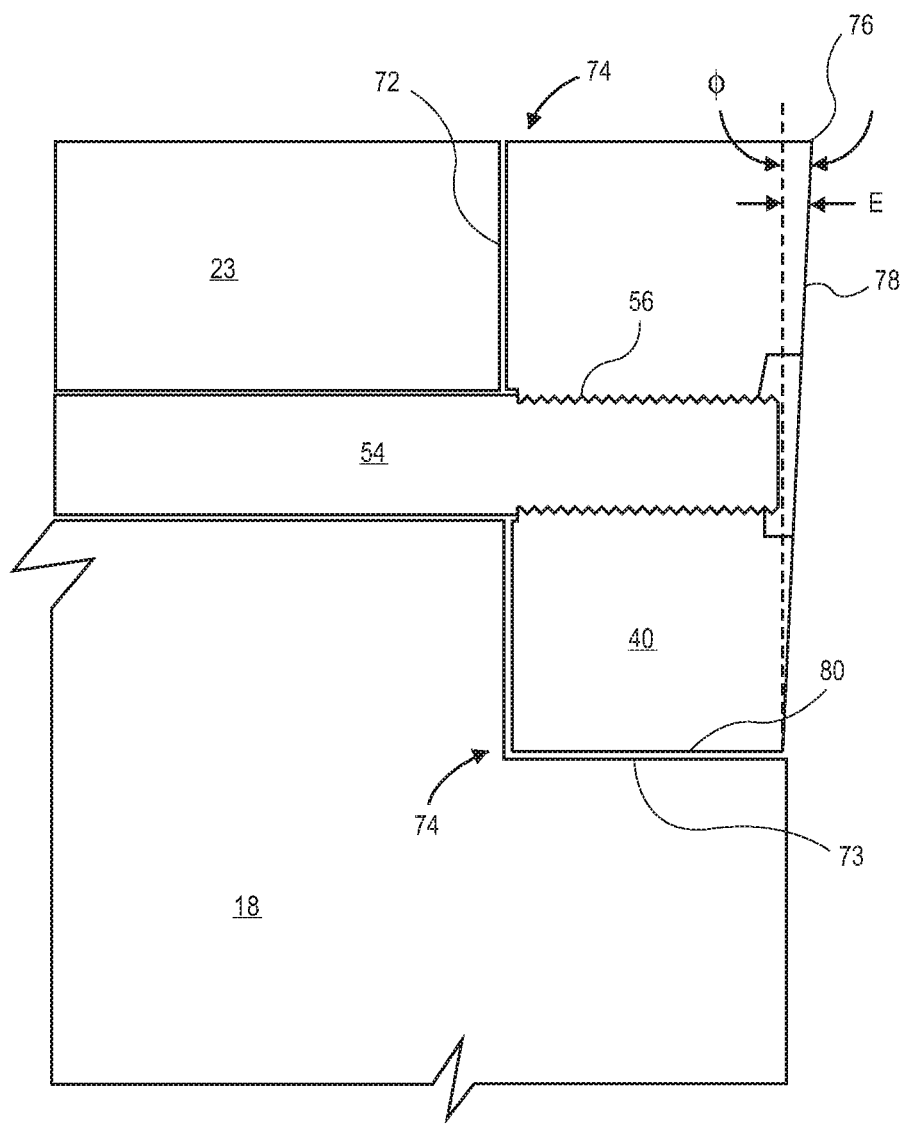
FIG. 8 is a partial cross-sectional view of a tapered cutting plate mounted in a cutting plate pocket in accordance with the disclosure.
Figure 9:
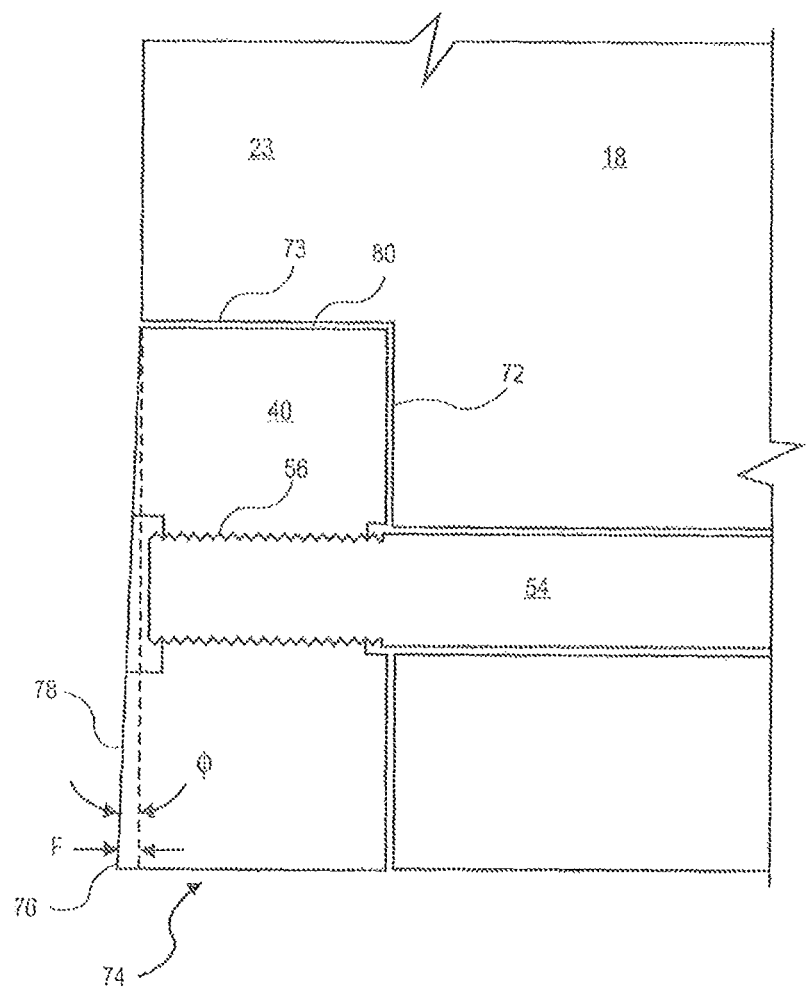
FIG. 9 is a partial cross-sectional view of a tapered cutting plate mounted in a cutting plate pocket in accordance with the disclosure.

In the embodiment shown in FIGS. 8 and 9 the cutting plates 40 are generally not rectangular in cross-section but are tapered. FIGS. 8 and 9 will now be described as they are opposing jaws 23 according to another embodiment. The cutting plates 40 are attached to the jaws 23 via the threaded portions 56 on the bolts 54. In the embodiment shown in FIGS. 8 and 9, the cutting plate pockets 74 are generally squared cross-section. In other words, the vertical wall 72 and the horizontal wall 73 lead at substantially a right angle. However the cutting plates 40 themselves are tapered as illustrated by arrows E and F. Arrows E and F illustrate a position of the cutting face 78 with respect to actual horizontal line represented by the dashed line. This is also be represented by angle θ. In some embodiments the angle θ is between 0.2 and 2 degrees. In other embodiments is between 0.45 and 1 degree. The cross-section of the cutting plate 40 is such that the cutting plate 40 is more narrow at the base 80 then is at the other end defining the cutting edge 76. The base 80 may contact or be spaced from the horizontal wall 73 of the cutting pocket 74. The base 80 may also contact or be spaced from the vertical wall 72 of the cutting pocket 74. While shims 61 are not illustrated in the FIGS. 8 and 9 they may optionally be used.

INDUSTRIAL APPLICABILITY

The present disclosure is applicable to shears of all sizes and uses. While the present application is directed primarily to heavy-duty hydraulic shears 18 aspects according to the disclosure may be applicable to any type of shear. By providing a cutting edge 76 that extends toward an opposing shear jaw 23 and a cutting face 78 that is tapered from the cutting edge 76 away from the opposing shear jaw 23, a shear 18 may work more reliably in cutting or shearing materials. Furthermore, less force may be required to move for slide the shear jaws 23 past each other once the two cutting edges 76 on the two share jaws 23 have moved past each other because the cutting faces 78 will be farther from each other as the shear jaws 23 close.

The amount of the taper of the shear faces (also referred to as camber) may vary per application. However one of ordinary skill the art will understand that providing too much camber may result in a cutting edge 76 that wears to quickly and providing not enough of a camber may result in a lack of the benefit from the apparatus described herein.

What is claimed is:

1. A shear comprising:
  a first jaw having a first longitudinal side;
  a second jaw connected to the first jaw by a pivot shaft and having a second longitudinal side parallel to the first longitudinal side, at least one of the first and second jaws being configured to pivot with respect to the other of the first and second jaws about a longitudinal axis of the pivot shaft to slide the second longitudinal side of the second jaw past the first longitudinal side of the first jaw in a shearing motion; and
  a first side cutting plate attached to the first longitudinal side of the first jaw,
  wherein the first side cutting plate defines a cutting face that has a cutting edge, the cutting edge being perpendicular to the longitudinal axis of the pivot shaft,
  wherein the cutting face has a positive camber relative to movement of the second jaw past the first jaw in the shearing motion such that the cutting edge is located furthest from the first jaw to which the first side cutting plate is attached than any other portion of the cutting face.

2. The shear of claim 1, wherein the positive camber is within the range of 0.2 to 2 degrees.

3. The shear of claim 2, wherein the positive camber is within the range of 0.45 to 1 degree.

4. The shear of claim 1, wherein the first side cutting plate is positioned within a cutting plate pocket defined within the first jaw.

5. The shear of claim 4, wherein the first side cutting plate is rectangular in cross-section.

6. The shear of claim 5, further comprising a shim located between the first side cutting plate and a vertical wall of the cutting plate pocket, the shim dimensioned to provide, at least in part, the positive camber of the cutting face.

7. The shear of claim 5, wherein the cutting plate pocket comprises a tapered vertical wall that is dimensioned to provide the positive camber of the cutting face.

8. The shear of claim 4, wherein the first side cutting plate is tapered such that the cutting face is at an angle relative to an opposing face of the first side cutting plate and is thereby thicker at a portion of the first side cutting plate that defines the cutting edge than at a portion of the first side cutting plate opposite to the cutting edge.

9. The shear of claim 1, wherein the first side cutting plate is removable from the first jaw so as to be moved, reoriented, and reattached to the first jaw to expose a different edge as the cutting edge.

10. The shear of claim 1, further comprising a second side cutting plate located on the second jaw, wherein the second side cutting plate also has a positive camber relative to the movement of the second jaw past the first jaw in the shearing motion.

11. The shear of claim 1, wherein the first jaw is fixed and the second jaw pivots about the first jaw.

12. The shear of claim 1,
  wherein the shear is a hydraulic shear, and
  wherein at least one of the first and second jaws is actuated by a hydraulic cylinder.

13. A shear comprising:
  a first jaw having a first longitudinal side shear surface; and
  a second jaw having a second longitudinal side shear surface parallel to the first longitudinal side shear surface,
  wherein at least one of the first jaw and the second jaw are pivotally connected via a pivot shaft and pivotable about a longitudinal axis of the pivot shaft with respect to the other of the first and second jaws,
  wherein the first and second jaws are configured to slide past each other during a shearing motion,
  wherein at least one of the first and second longitudinal side shear surfaces has a cutting face having a cutting edge perpendicular to the longitudinal axis of the pivot shaft, and
  wherein the cutting face has a positive camber relative to movement of the first and second jaws past each other in the shearing motion such that the cutting edge is located furthest from said at least one of the first and second longitudinal side shear surfaces that has the cutting face than any other portion of the cutting face.

14. The shear of claim 13, wherein the angle of the camber is between 0.2 to 2 degrees.

15. The shear of claim 14, wherein the angle of the camber is between 0.45 to 1 degree.

16. The shear of claim 13, wherein the side shear surfaces are located on cutting plates that are removable from the jaws.

17. The shear of claim 16, wherein the positive camber is caused by at least one feature from the following features: a shim located between one of the first jaw and second jaw and the cutting plate; a cutting plate pocket including a tapered vertical wall that imparts the positive camber to the cutting plate; and the cutting plate itself having a tapered profile.

* * * * *